(12) United States Patent
Yamazaki et al.

(10) Patent No.: US 6,717,761 B2
(45) Date of Patent: Apr. 6, 2004

(54) RECORDING/REPRODUCING APPARATUS

(75) Inventors: Shigeru Yamazaki, Yokohama (JP);
Kemmei Masuda, Yokohama (JP);
Toshio Tsuchiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 09/816,404

(22) Filed: Mar. 26, 2001

(65) Prior Publication Data
US 2001/0048565 A1 Dec. 6, 2001

(30) Foreign Application Priority Data
Apr. 26, 2000 (JP) ........................................ 2000-131518
Jan. 18, 2001 (JP) ........................................ 2001-009651

(51) Int. Cl.$^7$ ............................. G11B 5/09; G11B 15/12
(52) U.S. Cl. ............................. 360/46; 360/61; 360/62; 360/64; 360/67; 360/68; 360/77.02
(58) Field of Search .......................... 360/62, 64, 84, 360/85, 65, 67, 77.02, 46, 21, 68, 77.07, 61

(56) References Cited

U.S. PATENT DOCUMENTS

| 4,594,621 | A | * | 6/1986 | Noguchi et al. ......... 360/77.15 |
| 4,628,373 | A | * | 12/1986 | Takahashi et al. ............ 360/62 |
| 4,742,414 | A | * | 5/1988 | Sakai et al. ............ 360/130.24 |
| 4,908,722 | A | * | 3/1990 | Sonobe ........................ 360/46 |
| 5,065,259 | A | * | 11/1991 | Kubota et al. ................ 360/32 |
| 5,233,478 | A | * | 8/1993 | Kanota ........................ 360/21 |
| 5,260,843 | A | * | 11/1993 | Ohtsuka et al. .............. 360/64 |
| 5,276,565 | A | * | 1/1994 | Higashiyama et al. ........ 360/64 |
| 5,369,534 | A | * | 11/1994 | Han ............................ 360/64 |
| 5,412,518 | A | | 5/1995 | Christner et al. |
| 5,517,369 | A | * | 5/1996 | Takeuchi et al. .............. 360/65 |
| 5,739,986 | A | * | 4/1998 | Van Vlerken et al. ... 360/281.8 |
| 6,067,200 | A | | 5/2000 | Ohba et al. |
| 6,201,654 | B1 | * | 3/2001 | Okamoto et al. ............. 360/48 |
| 6,243,240 | B1 | * | 6/2001 | Ozue et al. ............... 360/281.4 |
| 6,349,012 | B1 | * | 2/2002 | Okamoto et al. ........ 360/77.13 |
| 6,356,403 | B2 | * | 3/2002 | Ozue et al. ................... 360/64 |
| 6,452,736 | B1 | * | 9/2002 | Saiki et al. .................... 360/46 |
| 6,476,993 | B1 | * | 11/2002 | Aoki ........................... 360/64 |

FOREIGN PATENT DOCUMENTS

| JP | 5-325110 | 12/1993 |
| JP | 6-338001 | 12/1994 |
| JP | 7-201005 | 8/1995 |
| JP | 10-105909 | 4/1998 |
| JP | 10-177924 | 6/1998 |

* cited by examiner

Primary Examiner—David Hudspeth
Assistant Examiner—Natalia Figueroa
(74) Attorney, Agent, or Firm—McDermott, Will & Emery

(57) ABSTRACT

A recording/reproducing apparatus capable of switching over among a plurality of heads with high precision, wherein the apparatus is provided with: a recording/reproducing unit for recording/reproducing signals onto/from a recording medium with a plurality of heads; a generating unit for generating control data for controlling the recording/reproducing unit; and a transmitting unit for transmitting control data generated by the generating unit to the recording/reproducing unit, wherein priority is given in transmission to data for controlling the switching of the plurality of heads over other data.

8 Claims, 9 Drawing Sheets

RECORDING/REPRODUCING APPARATUS

BACKGROUND OF THE INVENTION

The present invention relates to an apparatus capable of controlling with high precision the recording and reproduction of signals by plural heads, and more particularly to a recording/reproducing apparatus in which a recording/regenerative integrated circuit with plural magneto resistive heads (hereinafter abbreviated to MR heads) connected thereto can be controlled with high precision. The invention further relates to an apparatus for reproducing digital information signals or the like with MR heads, and more particularly to a rotary magnetic head type apparatus in which bias currents to MR heads mounted on a rotary drum can be appropriately controlled.

An MR head, which can detect magnetic information signals entered from a recording medium, such as a magnetic tape or a magnetic disk, by variations in resistance, requires the supply of a detecting current (sense current). Furthermore, as such variations in resistance have a nonlinear characteristic with respect to the input magnetic field, an MR head also needs a bias current for keeping the operating point in a more linear region. Recently developed MR heads are designed to utilize these currents (hereinafter to be together referred to as bias currents).

Where MR heads are to be used in a rotary head type magnetic recording/reproducing apparatus, a bias current circuit and a preamplifier circuit are mounted on the rotary drum. Therefore, power to drive these circuits needs to be supplied to the rotary drum side, and it is usually transmitted via a rotary transformer or a slip ring (contact). Also, MR head bias current control signals are transmitted to the rotary drum side via the rotary transformer after being converted into A.C. signals, and further rectified on the rotary drum side to be converted into D.C. voltage signals for controlling the MR heads.

A technique to mount MR heads on a rotary drum and control bias currents to determine the operating points of the MR heads is described, e.g. in J-P-A No. 177924/1998. Further, J-P-A No. 105909/1998 discloses a bias current regulating apparatus capable of flowing optimal bias currents to individual MR heads. J-P-A No. 201005/1995 reveals a method by which optimal bias currents are applied to active MR heads at the time of executing each head switching command.

SUMMARY OF THE INVENTION

For high density recording/reproducing apparatuses using a magnetic tape, the prevailing trend is to increase the number of magnetic heads (MR heads) mounted on the rotary drum in order to expand the capacity and enhance the transfer rate. Since each MR head differs in sensitivity and optimal operating point according to its element length from the sliding surface of the tape (MR height), it is preferable to individually optimize the bias current where plural MR heads are to be used. However, if it is necessary to provide the rotary transformer for controlling the MR bias currents with as many channels as the MR heads, it will become difficult to increase the number of MR heads to be mounted on the rotary drum. Furthermore, where control information is to be transmitted in analog signals, there will be another problem of difficulty to achieve high enough precision.

An object of the present invention, therefore, is to provide a rotary magnetic head type apparatus permitting independent and precise regulation of bias currents supplied to plural MR heads mounted on a rotary drum in a simple structure.

In order to achieve the object, a rotary magnetic head type apparatus according to the invention is provided on a stationary drum side with a control signal generator for generating control signals for controlling the operating amperages of magneto resistive heads and on the rotary drum side with a decoder circuit for discriminating data of the control signals and a current supply circuit for supplying operating currents to the magneto resistive heads in response to the output signals of the decoder circuit. The control signals are transmitted over a single channel of a rotary transformer and set the operating currents of the magneto resistive heads. Further, the control signals may include control information regarding a regenerative amplifier for reproduced outputs of the magneto resistive heads and recording current setting for recording heads.

Another aspect relates to a regenerative integrated circuit comprising a current supply circuit and a regenerative amplifier, which is mounted on the rotary drum to switch over among the plurality of MR heads for operation in turn. Usually a regenerative integrated circuit for MR heads is controlled with digital data on three lines including Data, Clock and Chip Select (CS) lines. For this reason, a control signal generator for generating control signals for controlling the regenerative integrated circuit is provided on the stationary drum side, and a decoder circuit for discriminating data of the control signals is provided on the rotary drum side. The three-line signals for controlling the regenerative integrated circuit are supplied from the decoder circuit. This structure requires only one control line for transmission from the stationary side to the rotary side, even if the number of MR heads is increased. Moreover, since the transmitted signals are digital signals, highly precise transmission is made possible.

However, since additional functions in such a regenerative integrated circuit would entail a substantial increase in the quantity of data bits required for their control, if data required for all the controls are transmitted on every occasion of head switching, it will take too long a time. In the worst case, head switching may fail to be done at the desired timing, inviting a loss of some head-reproduced signals. If the number of MR heads is increased and the number of regenerative integrated circuits mounted on the rotary drum also increases, a similar problem will arise because the data for the increased integrated circuits that are used are transmitted by time-division multiplexing. This is also true of controlling the plurality of recording heads in each recording integrated circuit. It is essential to perform head switching at the desired timing in a recording/reproducing apparatus provided with plural heads not only of the MR type but also of any type.

Another object of the present invention is to provide a recording/reproducing apparatus permitting switching over among plural heads with high precision, in particular a rotary magnetic head type apparatus permitting switching over plural MR heads and recording heads mounted on a rotary drum at high speed.

In order to achieve the object, a recording/reproducing apparatus according to the present invention is provided with a recording/reproducing unit for recording/reproducing signals onto/from a recording medium with plural heads, a generating unit for generating control data for controlling the recording/reproducing unit, and a transmitting unit for transmitting control data generated by the generating unit to the recording/reproducing unit, wherein data for controlling the switching over among the plurality of heads are transmitted with priority over other control data.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail below.

Figure 1:
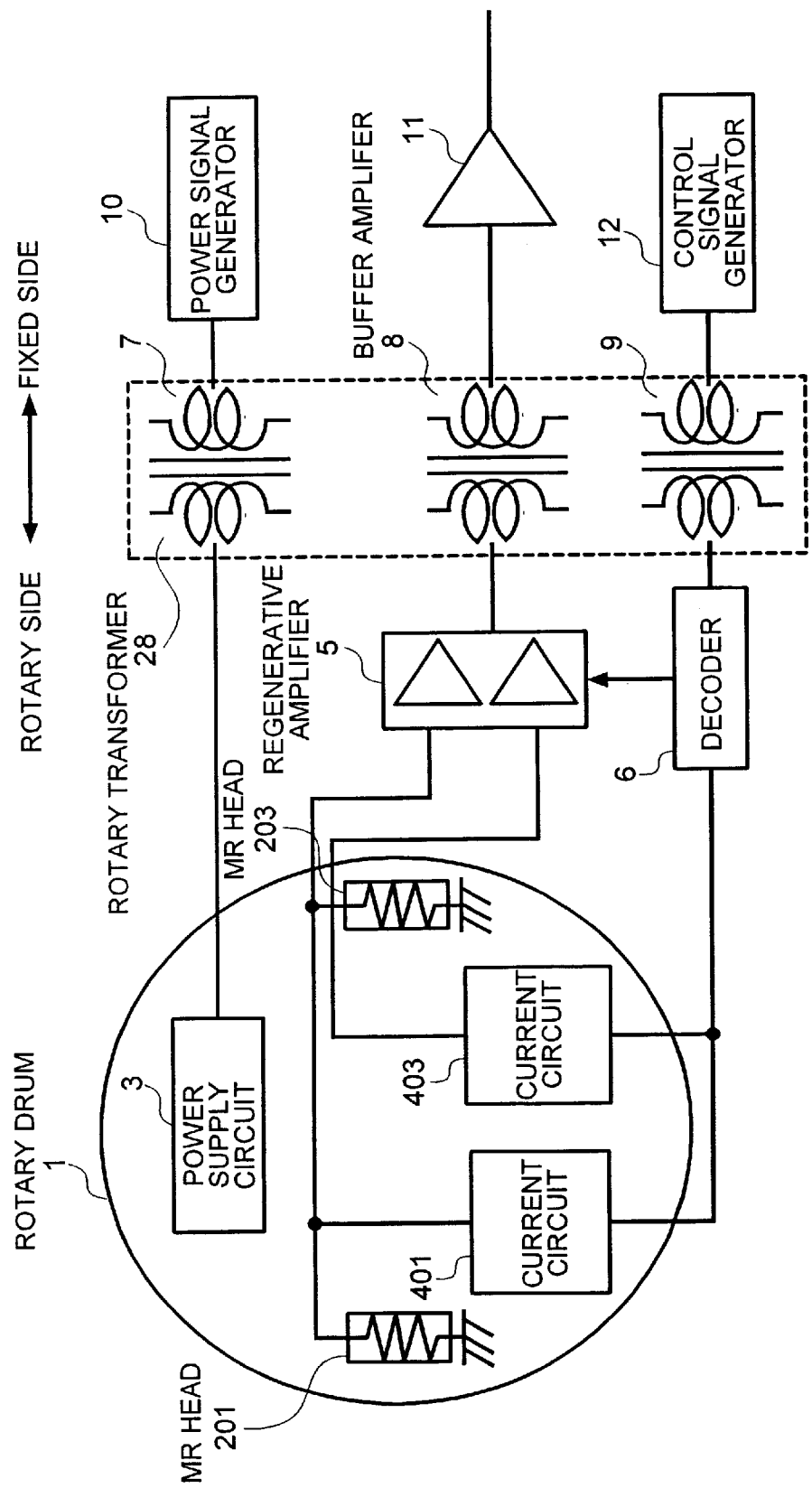
FIG. 1 is a block diagram illustrating a rotary magnetic head type apparatus, which is a preferred embodiment of the present invention.

FIG. 1 is a block diagram illustrating a rotary magnetic head type apparatus, which is a preferred embodiment of the present invention. A pair of MR heads 201 and 203 are fitted on a rotary drum 1 in opposite positions 180° apart to read signals recorded on a magnetic tape (not shown) wound approximately 180° in the rotating direction of the drum. Current circuits 401 and 403 are circuits for flowing bias currents to take out signals from the MR heads 201 and 203. A regenerative amplifier 5 is provided with a two-channel amplifier for the MR heads 201 and 203. A rotary transformer 28 for transmitting data between the stationary side and the rotary side is provided with a rotary transformer for power 7, a rotary transformer for reproduced signals 8 and a rotary transformer for control signals 9. Information signals on MR head bias current data generated by a control signal generator 12 are transmitted to the rotary side via the rotary transformer for control signals 9. A decoder 6 discriminates data of these signals, and controls the bias currents for the MR heads 201 and 203 by outputting control signals to the current circuits 401 and 403. Information signals reproduced by the MR heads 201 and 203 from the magnetic tape, after being amplified by the regenerative amplifier 5, are delivered to the rotary transformer for reproduced signals 8 and a buffer amplifier 11 to undergo signal processing.

Although the output signals of the control signal generator 12 are transmitted by the rotary transformer for control signals 9 to the rotary side in the above-described embodiment, a slip ring, for instance, may be fitted to the shaft of the rotary drum to transmit the signals directly from the stationary side via a contact. However, considering the risk of error occurrence due to the insufficient reliability of the contact or noise during the long period of high-speed rotation, the above-described transmission of the control signals by the rotary transformer is more preferable. The decoder 6 can be configured of an ordinary digital integrated circuit or, if adaptable in operating speed, a general-purpose microcomputer may be used instead. The buffer amplifier 11 can be configured of a low input impedance circuit, such as a common-base circuit.

Since such circuit components as the current circuits 401 and 403, regenerative amplifier 5 and decoder 6 are mounted on the rotary side in the foregoing structure, a power supply circuit 3 is provided on the rotary drum 1. The power supply circuit 3, comprises of a rectifier circuit and a voltage regulator, and operates to obtain a desired D.C. voltage from the output A.C. signal of a power signal generator 10 transmitted via the rotary transformer for power 7. For instance, if a final D.C. voltage of 5 V is desired, a switching signal of about 20 Vp-p, 100 kHz is generated from the stationary side D.C. source voltage of 12 V by the power signal generator 10. Then, the rotary transformer for power 7 having a turns ratio of 1:1 and a half-wave rectifier circuit as the rectifier circuit are used to obtain a D.C. voltage of around 7 V. Further a 5 V D.C. voltage regulator can be operated.

Another applicable method for power supply is to fit a slip ring or the like to the shaft of the rotary drum to transmit a voltage directly from the stationary side via a contact. In this case, as the high-speed rotation of the rotary drum 1 continues for a long period, insufficient reliability of the contact or noise might pose a problem. Therefore, the aforementioned power transmission using the rotary transformer is more preferable.

In this embodiment of the invention, it is possible to switch the output signals of the decoder 6 at every 180° turn of the rotary drum 1. Thus, one out of the MR heads 201 and 203, what is on the operating side (what is in contact with the magnetic tape and reproducing signals), is individually controlled to position it on the optimal operating bias point. The control enables the two MR heads 201 and 203 to be controlled with outputs from the one-channel rotary transformer for control signals 9 and the single decoder 6. In this case, the bias current to the non-operating MR head (not in contact with the magnetic tape) takes on the same amperage as that for the operating MR head.

It is also possible to output at the same time a signal from the control signal generator 12 to switch over the regenerative amplifier 5 at every 180° turn. The decoder 6 discriminates data, switches over the regenerative amplifier 5 consisting of a two-channel amplifier, and chooses between the output signals of the MR heads 201 and 203. The selected output signal is transmitted to the stationary side buffer amplifier 11 via the rotary transformer for reproduced signals 8. This structure enables the output signals of the MR heads 201 and 203 to be transmitted by the single channel rotary transformer for reproduced signals 8.

As described above, according to the present invention, it is possible to independently control each of the bias currents for plural MR heads mounted on the rotary drum with a one-channel control signal sent from the stationary drum side, and let them operate at their respective optimal points.

Figure 2:
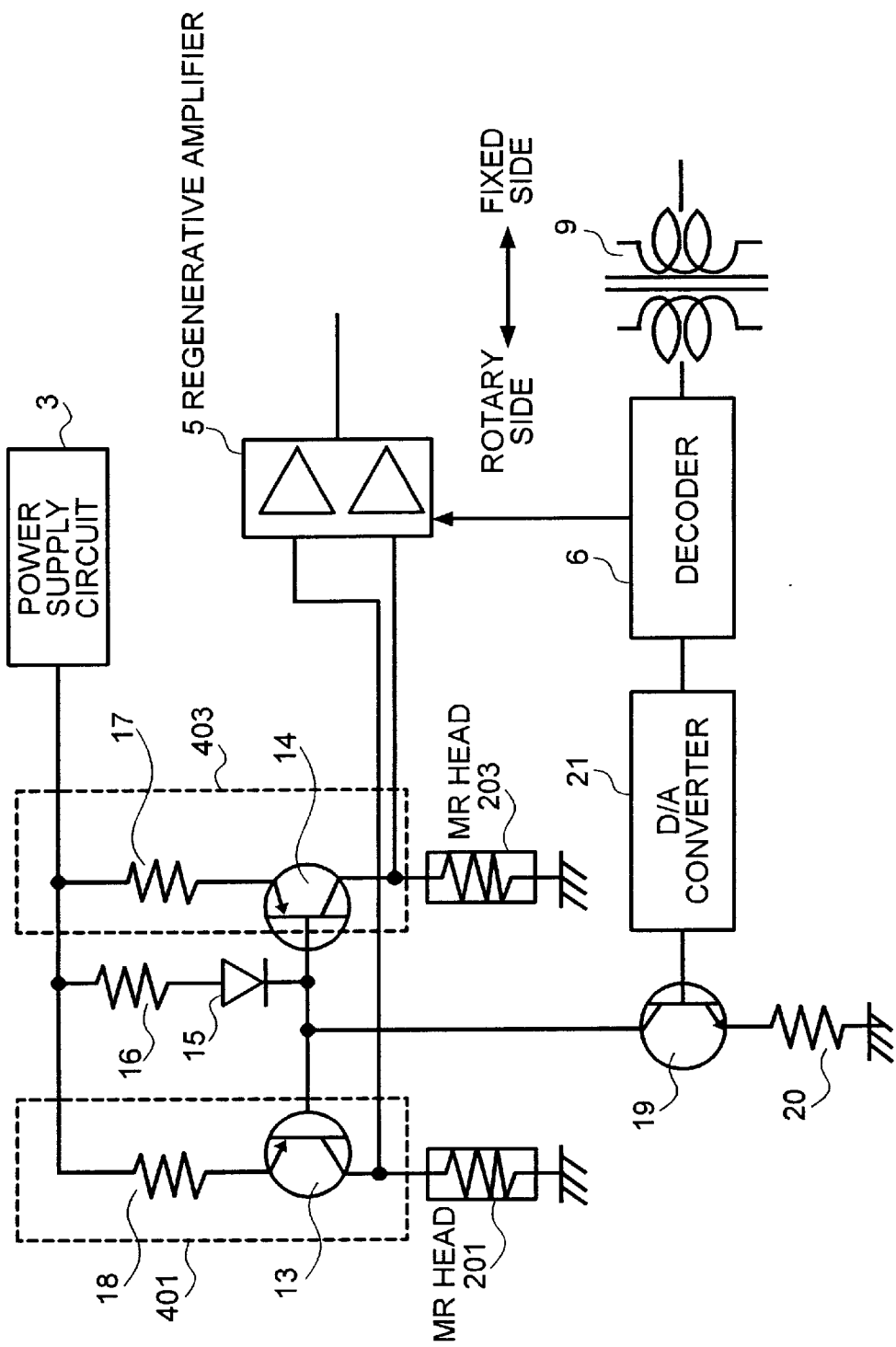
FIG. 2 illustrates bias current supply circuits in the rotary magnetic head type apparatus shown in FIG. 1.

FIG. 2 illustrates bias current supply circuits 401 and 403 shown in FIG. 1. A Miller current circuit is configured of transistors 13 and 14, resistors 17 and 18, a diode 15 and a resistor 16. It operates so that currents proportional to currents flowing to a transistor 19 and a resistor 20 flow to the MR heads 201 and 203. The diode 15 is connected for temperature compensation for the transistors 13 and 14. The decoder 6 discriminates information on bias currents for the MR heads 201 and 203 transmitted via the rotary transformer for control signals 9, and transmits the discriminated data to a digital-to-analog (D/A) converter 21. The D/A converter 21 converts the digital data into analog D.C. voltage signals, which are further converted by the transistor 19 and the resistor 20 into D.C. currents. Thus, the bias currents for the MR heads 201 and 203 can be controlled with the D.C. output voltage of the D/A converter 21. Where the number of MR heads used in this embodiment is to be increased, as many circuits each configured of the transistor 13 and the resistor shown in FIG. 2 as the total number of heads are provided. Half as many D/A converters 21 as the total number of heads would suffice where two each out of plural MR heads are arranged opposite to each other at 180°. Where they are not arranged opposite at 180°, as many D/A converters 21 as the total number of heads can be provided.

Figure 3:
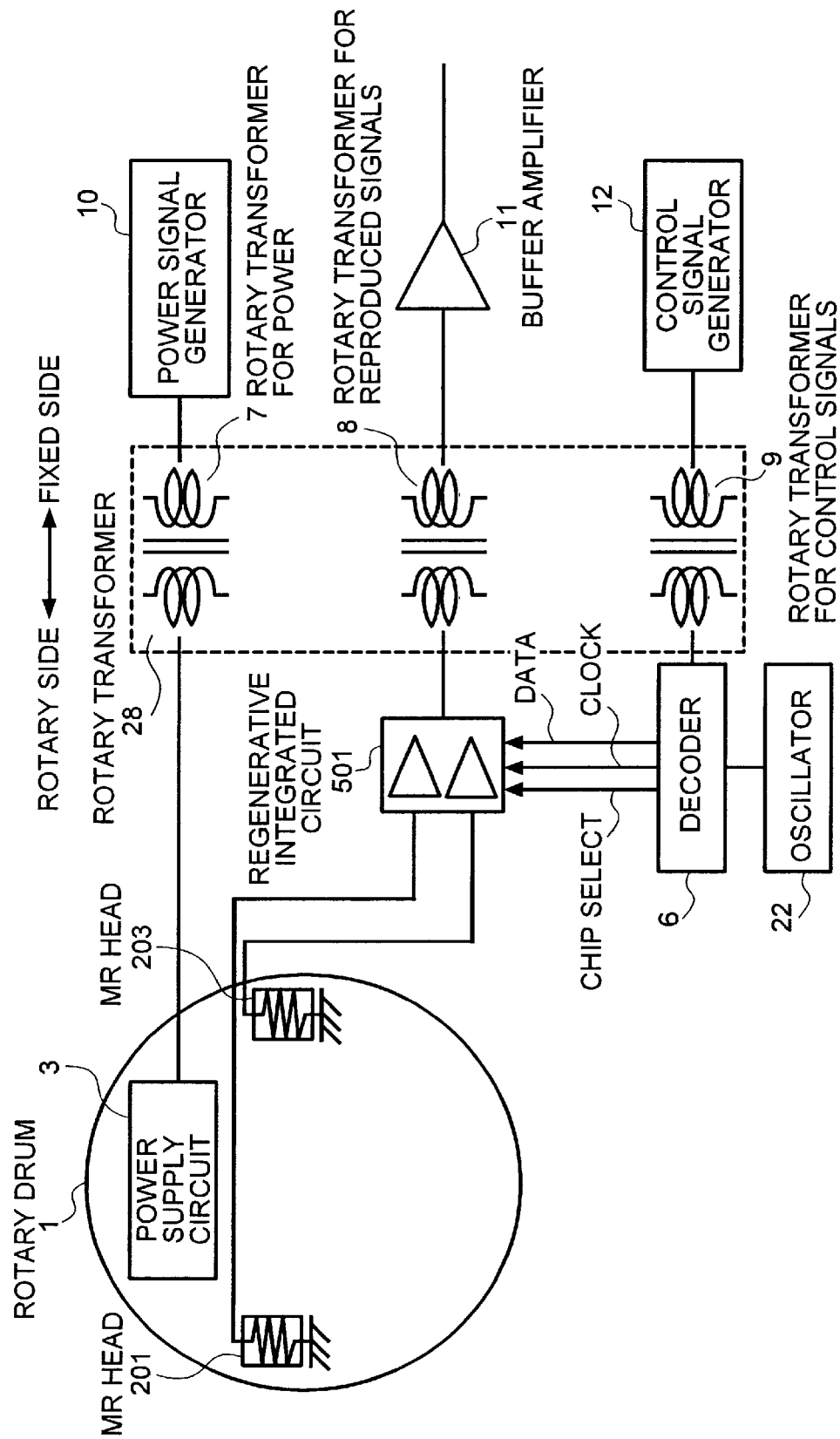
FIG. 3 is a block diagram illustrating a rotary magnetic head type apparatus, which is another preferred embodiment of the present invention.

The embodiment illustrated in FIG. 3 is a version of what is shown in FIG. 1, the difference being that the regenerative amplifier 5 is integrated with the current circuits 401 and 403 to be together used as a regenerative integrated circuit 501 and an oscillator 22 is connected to the decoder 6. The same components as in FIG. 1 are denoted by respectively the same reference numerals. The regenerative integrated circuit 501 is provided with a two-channel amplifier for the MR heads 201 and 203, and its operating mode is controlled with data on three control lines including Data, Clock and CS lines. The control functions include, for instance, head (amplifier) switching, MR head bias current setting, regenerative amplifier gain setting, detection of thermal asperity (TA) noise peculiar to MR heads and correction. A register matching each function is selected in advance, and control data are written into it to determine its operating state and value.

Information signals on the magnetic tape reproduced by the MR heads 201 and 203 are amplified by the regenerative integrated circuit 501. After that, they are sent to the rotary transformer for reproduced signals 8 and the buffer amplifier 11 to undergo the following signal processing. The buffer amplifier 11 is configured of a low input impedance circuit, such as a common-base circuit. Information signals for the regenerative integrated circuit 501 generated by the control signal generator 12 are transmitted to the rotary side via the rotary transformer for control signals 9, and subjected to data discrimination by the decoder 6, which thereby controls the operation of the regenerative integrated circuit 501.

As the three different control signals of the regenerative integrated circuit 501 here are digital signal strings, the decoder 6 is also provided with the oscillator 22 for generating digital signals, and discriminates control data transmitted from the control signal generator 12. Then, the decoder 6 operates to convert these data into digital control data for the regenerative integrated circuit 501 and output them in that form. This structure enables the three control lines to be used as they are even if the number of MR heads 201 and 203 further increases and additional regenerative integrated circuits 501 are provided. It has to be noted, though, that as many CS lines as the number of regenerative integrated circuits 501 that are used would be required. The oscillation frequency of the oscillator 22 is selected from a range of 20 to 30 MHz, though it depends on the type and number of regenerative integrated circuits 501 used.

By controlling the operating mode in this way, each of the MR heads 201 and 203 can be controlled fully independently of each other. For instance, bias currents for two MR heads differing in MR height can be controlled to keep their respective optimal amperages. Also, the service life of an MR head as an element, as it is dependent on the product of the bias current amperage and the duration of current supply, can be extended by control to minimize the bias current for the MR head during the non-operating 180° period. Further, by switching the gain of the regenerative amplifier in 180° periods, the amplitude of the output signals of the regenerative integrated circuit 501 can be kept constant.

Figure 4:
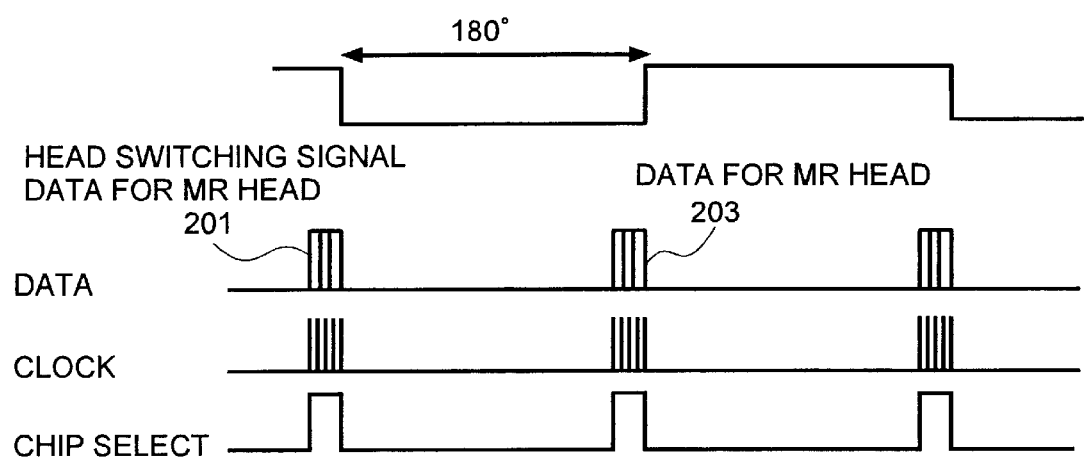
FIG. 4 illustrates the control timing in a regenerative integrated circuit in the rotary magnetic head type apparatus shown in FIG. 3.

FIG. 4 illustrates the control timing in the regenerative integrated circuit 501. As illustrated, data signals are delivered to the three control lines including Data, Clock and CS immediately before the timing of head switching (signal varying point) to control the regenerative integrated circuit 501. For instance, by changing head (amplifier) switching information data and MR bias current data on the Data line at every 180°, the bias currents for the MR heads 201 and 203 in contact with the magnetic tape and reproducing signals can be set to their respective optimal amperages. Further a desired one of the output signals of the MR heads 201 and 203 is selected by switching the regenerative integrated circuit 501 consisting of a two-channel amplifier, and it can be transmitted to the stationary side buffer amplifier 11 via the one-channel rotary transformer for reproduced signals 8.

Since the control data here for the regenerative integrated circuit 501 should include the address of the control register when they are transmitted, about 20 bytes or more of data are transmitted at every time of head switching. Therefore, transmission of all the data would take 10 μs of time or more, though it partly depends on the clock frequency of the decoder 6. This period of time will lengthen with an increase in control data as the function of the regenerative integrated circuit 501 is enhanced and with an increase in the number of regenerative integrated circuits 501.

In such a state, as head switching fails to take place when it should, there will arise problems that some signals are dropped and signals are reproduced in a state where MR heads are not kept at their respective optimal operating points. In this embodiment of the invention, in order to prevent loss or wrong setting of data at the time of head switching, top priority in the transmission of digital data at the time of head switching is given to head switching signal data and MR current control signal data.

The control timing in the regenerative integrated circuit 501 will now be explained in detail with reference to FIG. 9. In accordance with the operational timing shown in FIG. 4, head switching signal data and the address of their storage, e.g. the address of register A, are first transmitted. In the regenerative integrated circuit 501, control varies immediately after the reception of data, and the operating regenerative amplifier is switched to that on the MR head 201 side. Then, operating current data for the MR head 201 and the address of register B in which they are to be stored are transmitted to place the MR head 201 in a state in which it can be operated by a normal current. Finally, the addresses of plural registers and corresponding data for controlling the amplifier gain, high-pass filter cut-off frequency and correction data for thermal asperity noise are transmitted. Thus, head switching signal data and operating current data are transmitted prior to all other data. At the next timing of 180° switching, the regenerative amplifier is controlled to be switched over to the MR head 203 side by a similar operation. Such data as the amplifier gain need not be transmitted at every time of head switching, but may be transmitted at the time of starting up the apparatus or when control becomes necessary.

The control method describe above can prevent any reproduced signal loss due to an increase in head switching time and ensure stable data reproduction because the head switching operation performed at every 180° and the setting of the MR head operating current are finalized early.

Figure 10:
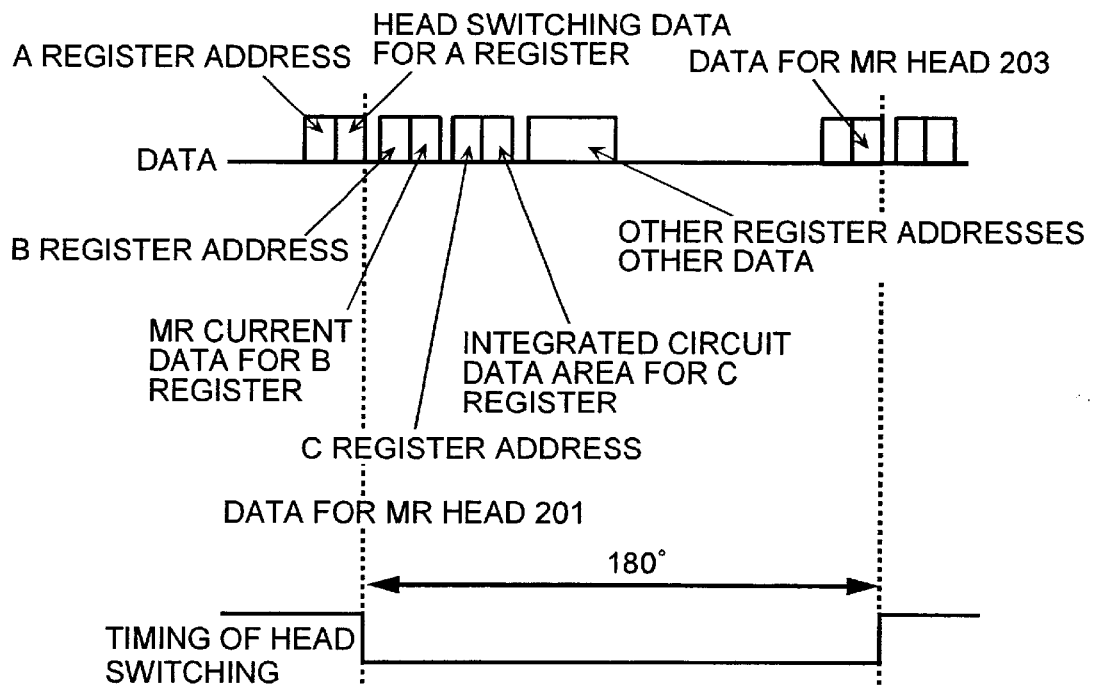
FIG. 10 illustrates in detail the control timing in an alternative manner in the regenerative integrated circuit in the rotary magnetic head type apparatus shown in FIG. 3.

FIG. 10 illustrates in detail the control timing in another way in the regenerative integrated circuit 501 in this embodiment.

Figure 9:
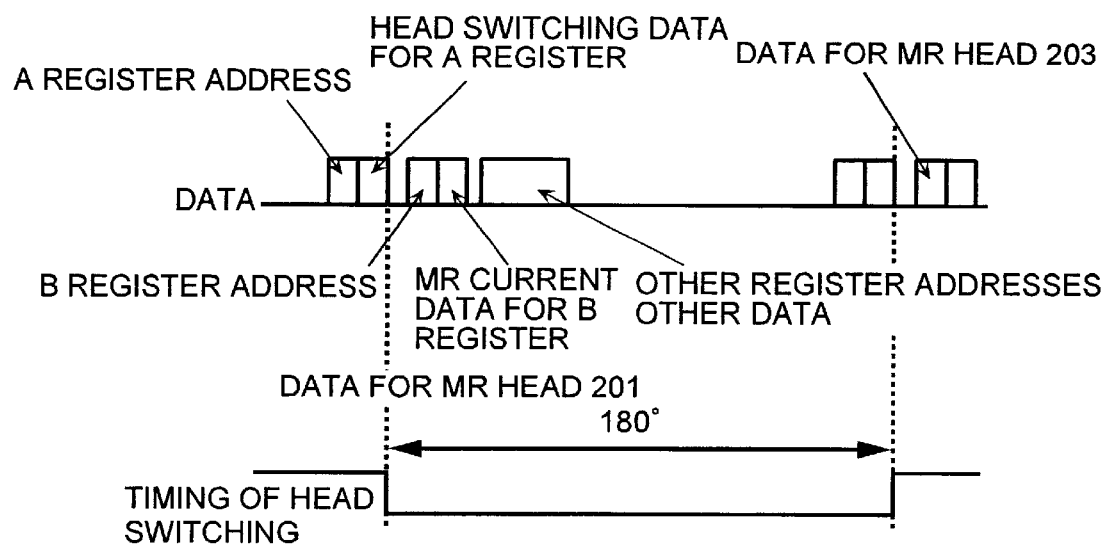
FIG. 9 illustrates in detail the control timing in the regenerative integrated circuit in the rotary magnetic head type apparatus shown in FIG. 3.

This way of timing is the same as that in the embodiment shown in FIG. 9 in that head switching signal data and the address of register A into which they are stored are transmitted first, and operating current data for the MR head and the address of register B in which they are to be stored are transmitted second. In the embodiment of FIG. 10, the next data is allocated for reading the operating state of the regenerative integrated circuit 501. Register C shown here stores, for instance, information on the result of detection of opening or short-circuiting of MR heads connected to the regenerative integrated circuit 501 and any abnormality in source voltage. The decoder 6, contrary to the usual way, reads data from the regenerative integrated circuit 501 and re-encodes them, and transmits the data to the control signal generator 12 on the stationary side via the rotary transformer for control signals 9. By this bidirectional communication, the states of the MR heads 201 and 203 on the rotary drum 1 can be detected from the stationary side.

However, the above-described operation requires the addition of a bidirectional signal processing circuit to the decoder 6 and the control signal generator 12. Or where these items of information are outputted from dedicated output terminals of the regenerative integrated circuits 501 and 502 instead of being supplied to the Data line, connection can be made directly to the decoder 6.

This embodiment permits transmission of the operating state of the regenerative integrated circuit 501 to the stationary drum side at every timing of head switching, and any faulty operation of the MR head 201 or 203 or occurrence of thermal asperity noise can be coped with in a short period of time.

Figure 5:
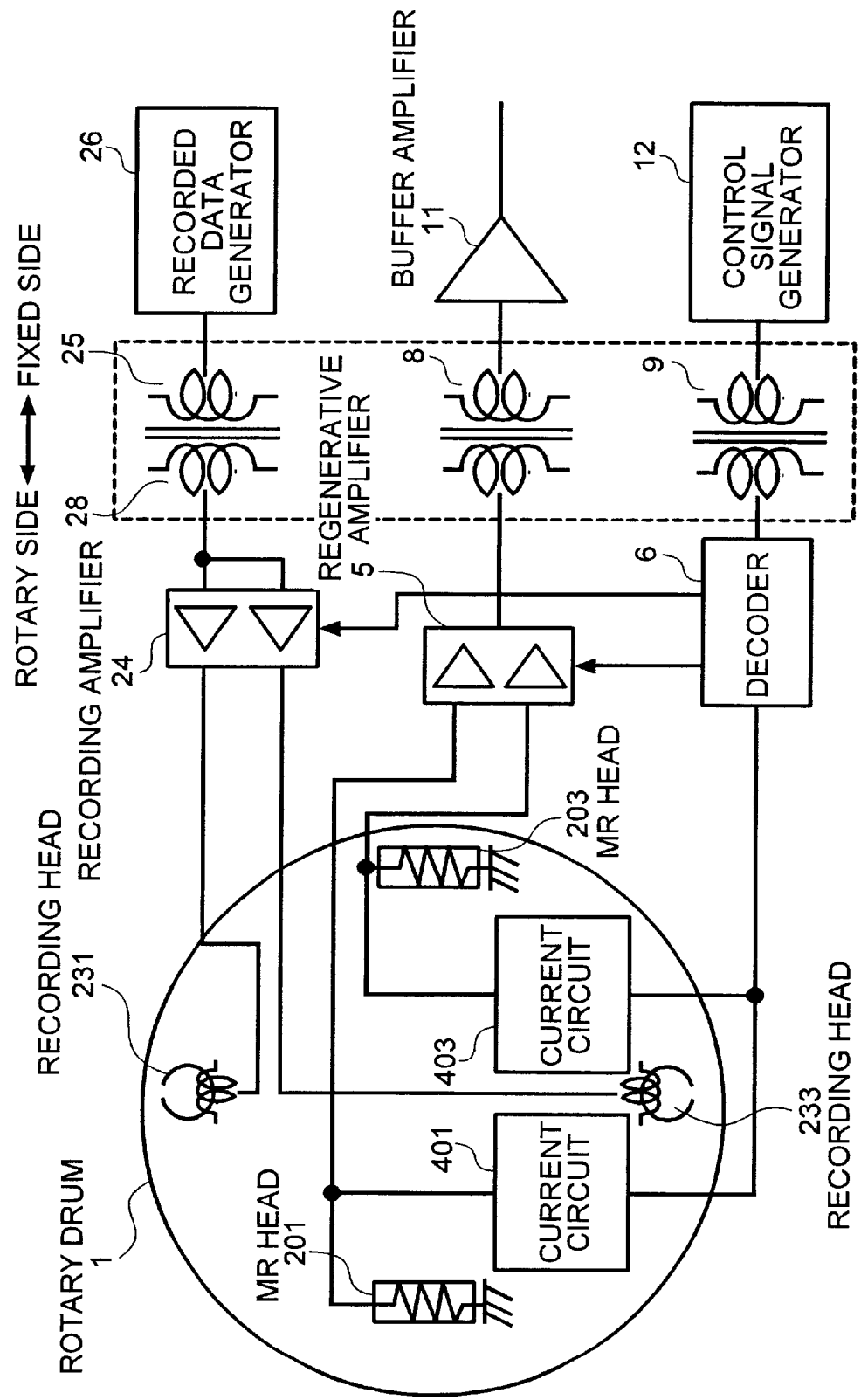
FIG. 5 is a block diagram illustrating a rotary magnetic head type apparatus, which is still another preferred embodiment of the present invention.

FIG. 5 is a block diagram illustrating a rotary magnetic head type apparatus, which is still another preferred embodiment of the present invention. In FIG. 5, the same components as in FIG. 1 and FIG. 3 are denoted by respectively the same reference numerals. In this embodiment, a pair of recording heads 231 and 233 in opposite positions 180° apart and a recording amplifier 24 with a two-channel output are mounted on the rotary drum 1 to perform recording and reproduction. The recording heads 231 and 233 are arranged in positions respectively 90° off the MR heads 201 and 203. The heights between the heads are so determined that data tracks recorded on the magnetic tape by the recording heads 231 and 233 can be reproduced as they are by the MR heads 201 and 203. The rotary transformer 28 is provided with a rotary transformer for recorded data 25. Recorded data encoded by a recorded data generator 26 are transmitted to the rotary side via the rotary transformer for recorded data 25. The recording amplifier 24 converts voltage information signals from the rotary transformer for recorded data 25 into currents, and supplies prescribed recording currents to the recording heads 231 and 233. In this process, the amperages of the recording currents from the recording amplifier 24 are controlled by the decoder 6. This operation is the same as the control method for the bias currents for the MR heads 201 and 203 described with reference to FIG. 1, and the current gain of the recording amplifier 14 can be varied with the D.C. output voltage of the decoder 6. Further by selecting the channel output of the recording amplifier 24 at 180° intervals and keeping the recording amplifier 24 on the non-operating side in a non-recording state, the heat generation by the recording amplifier 24 mounted on the rotary drum can be reduced.

This structure enables the recording heads 231 and 233 to record data and at the same time the MR heads 201 and 203 to reproduce data. For this reason, in the regulation to optimize the bias currents for the MR heads 201 and 203 relative to the recording characteristics of the recording heads 231 and 233, there is no need to rewind the magnetic tape, making it possible to complete the regulation in a correspondingly shorter period of time.

Although the recording amplifier 24 is mounted on the rotary side in this embodiment, it may as well be provided on the stationary side. However, its arrangement on the rotary side serves to halve the number of channels required for the rotary transformer for recorded data 25 and in this way smaller amplitude data signals would suffice for transmission to the rotary transformer for recorded data 25, with the result that cross talk to the rotary transformer for reproduced signals 8 can be minimized. Although the mounting positions of the recording heads 231 and 233 are supposed to be at 90° with respect to the MR heads 201 and 203 in this embodiment, they may as well be at or around 0°. Their positions are not necessarily limited.

Figure 6:
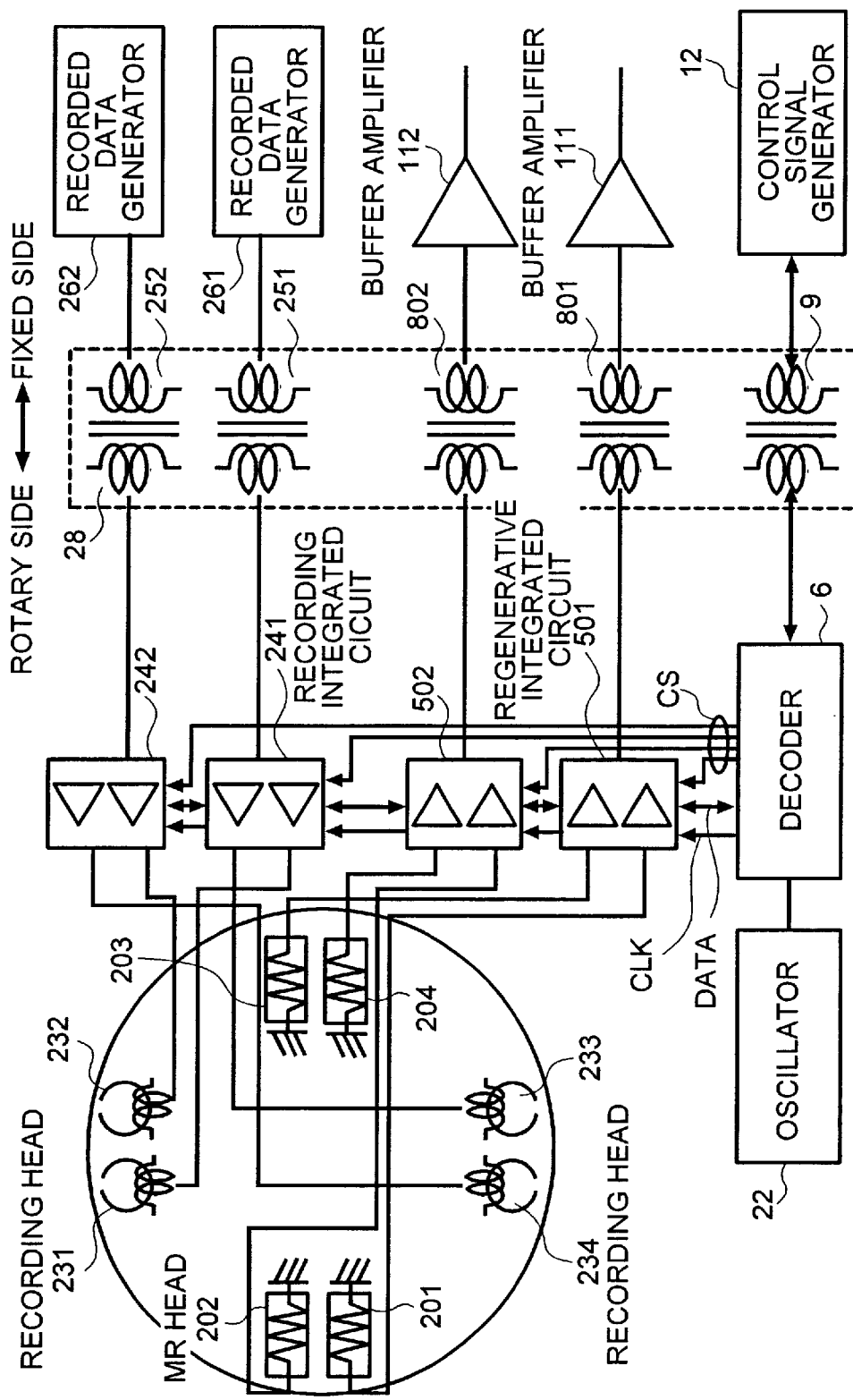
FIG. 6 is a block diagram illustrating a rotary magnetic head type apparatus, which is yet another preferred embodiment of the present invention.

FIG. 6 is a block diagram illustrating a rotary magnetic head type apparatus, which is yet another preferred embodiment of the present invention. The same components as in FIG. 1, FIG. 3 and FIG. 5 are denoted by respectively the same reference numerals. In this embodiment, there are provided four each of recording heads and MR heads, and two each of recording or reproducing heads are paired and constitute a double azimuth (DA) structure, in which they differ in azimuth angle from each other. This structure results in double as fast a data transfer speed as the rotary magnetic head type apparatus shown in FIG. 5. Pair combinations are recording heads 231 and 232, 233 and 234, MR heads 201 and 202, and 203 and 204. Further, the recording heads 231, 232, 233 and 234 and the MR heads 201, 202, 203 and 204 are arranged at 90° intervals, and the recording heads 231 and 233, the recording heads 232 and 234, the MR heads 201 and 203 and the MR heads 202 and 204 are mounted opposite to each other at 180°.

Two sequences of data signals outputted at the same time from the recorded data generators 261 and 262 are recorded onto the magnetic tape via the pairs of rotary transformers for recorded data 251 and 252, recording integrated circuits 241 and 242, and recording heads 231 and 232 or 233 and 234. At the time of reproduction, signals reproduced from the pairs of MR heads 201 and 202 or 203 and 204 are transmitted to buffer amplifiers 111 and 112 on the stationary side via regenerative integrated circuits 501 and 502 and rotary transformers for reproduced signals 801 and 802.

The recording integrated circuits 241 and 242 and the regenerative integrated circuits 501 and 502, like their respective counterparts in the embodiment illustrated in FIG. 3, are controlled with three kinds of digital signals including Data, Clock and CS signals. In this embodiment, provided with two each of recording integrated circuits 241 and 242 and regenerative integrated circuits 501 and 502, there are four CS lines of output signals from the decoder 6. The regenerative integrated circuits 501 and 502 are provided with bias current supply circuits for the MR heads, and control the head switch and the amperages of bias currents for MR heads. In the recording integrated circuits 241 and 242, the head switch and recording current amperages are controlled with three kinds of digital signals.

These control data are generated by the control signal generator 12, and transmitted to the decoder 6 via the one-channel rotary transformer for control signals 9. The decoder 6 generates control data for the recording integrated circuits 241 and 242 and the regenerative integrated circuits 501 and 502 to handle these information data, and controls them via the six control lines. These output data signals are generated in accordance with oscillation clocks from the oscillator 22 connected to the decoder 6.

In this embodiment, the bias currents for MR heads 201, 202, 203 and 204 mounted on the rotary drum 1 can be regulated independently of one another. Further, as the recording integrated circuits 231 and 232 are controlled from the stationary side, setpoints of the recording currents for the recording heads 231, 232, 233 and 234 can also be regulated independently of one another.

Here, if the Data line connected to the recording integrated circuits 241 and 242 and the regenerative integrated circuits 501 and 502 is a two-way path, for instance the terminal voltages of the MR heads, data on the occurrence of thermal asperity (TA) noise on the MR heads, the result of detection of opening or short-circuiting of heads can be delivered to the decoder 6, and these items of information can be transmitted to the stationary side. This requires the addition of a bidirectional signal processing circuit to the decoder 6 and the control signal generator 12, though. Or where these items of information are not outputted to the Data line, they can be inputted directly to the decoder 6.

Although the recording integrated circuits 241 and 242 and the regenerative integrated circuit 501 and 502 were described separately, they can be configured of a combined recording/reproducing integrated circuit, and the recording and reproducing functions can be switched over between each other using the aforementioned three control lines.

Figure 7:
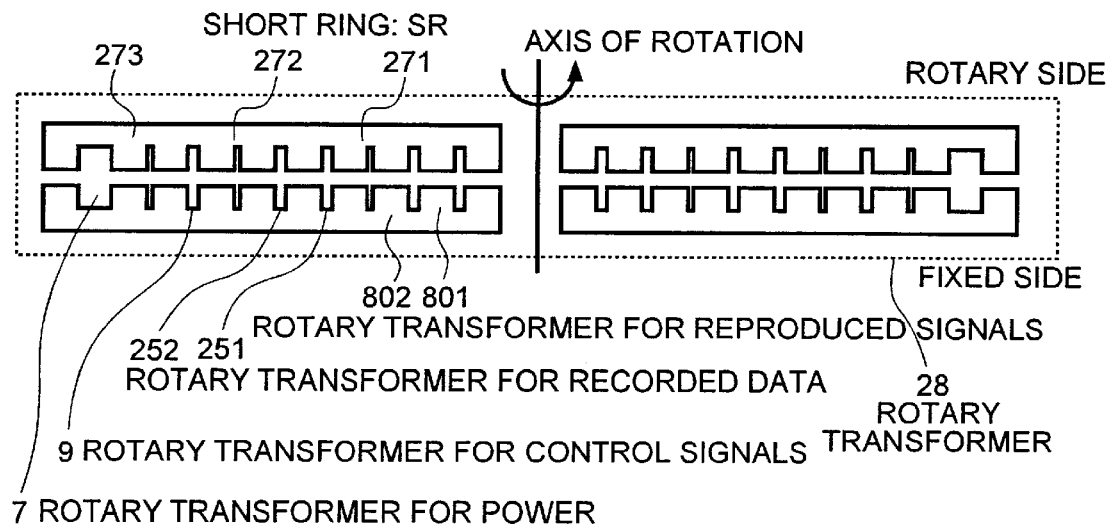
FIG. 7 illustrates rotary transformers in the rotary magnetic head type apparatus shown in FIG. 6.

FIG. 7 illustrates embodiments of rotary transformers in the rotary magnetic head type apparatus shown in FIG. 6. The rotary transformer 28 is provided with a rotary transformer for power 7, a rotary transformer for control signals 9, rotary transformers for recorded data 251 and 252, and rotary transformers for reproduced signals 801 and 802. In the slots of the rotary transformers, short rings 273, 272 and 271 are inserted to reduce signal cross talk between the transformers. For this purpose, altogether nine such slots are provided. Although the rotary transformer 28 in the embodiment shown in FIG. 7 has a planar shape, it may as well be a coaxial cylinder instead.

Figure 8:
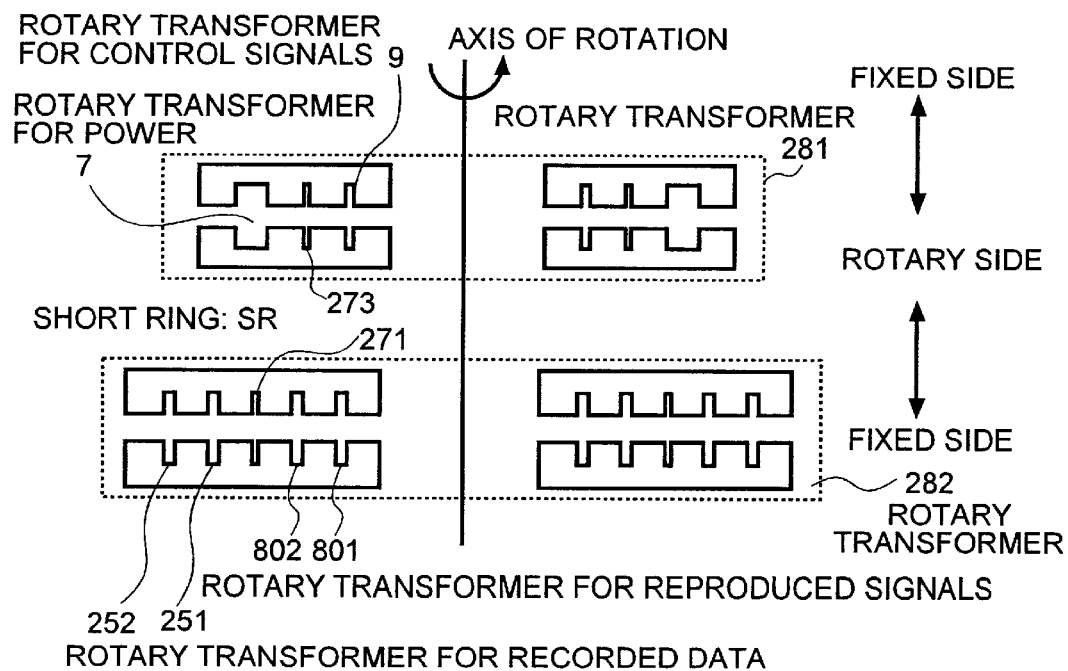
FIG. 8 illustrates rotary transformers embodied in an alternative manner in the rotary magnetic head type apparatus shown in FIG. 6.

FIG. 8 illustrates rotary transformers embodied in another way in the rotary magnetic head type apparatus shown in FIG. 6. This is an instance in which, unlike the embodiment shown in FIG. 7, the rotary transformer 28 is separated into a first rotary transformer 281 having the rotary transformer for power 7 and the rotary transformer for control signals 9 and a second rotary transformer 282 having the rotary transformers for recorded data 251 and 252 and the rotary transformers for reproduced signals 801 and 802. Compared with embodiment of FIG. 7, this embodiment permits a reduction in the number of slots per rotary transformer and the use of a rotary drum smaller in diameter. For this embodiment, too, a coaxial cylindrical rotary transformer may be divided into two parts. Alternatively, the first rotary transformer 281 may be planar and the second rotary transformer 282 may be cylindrical, or vice versa.

Figure 11:
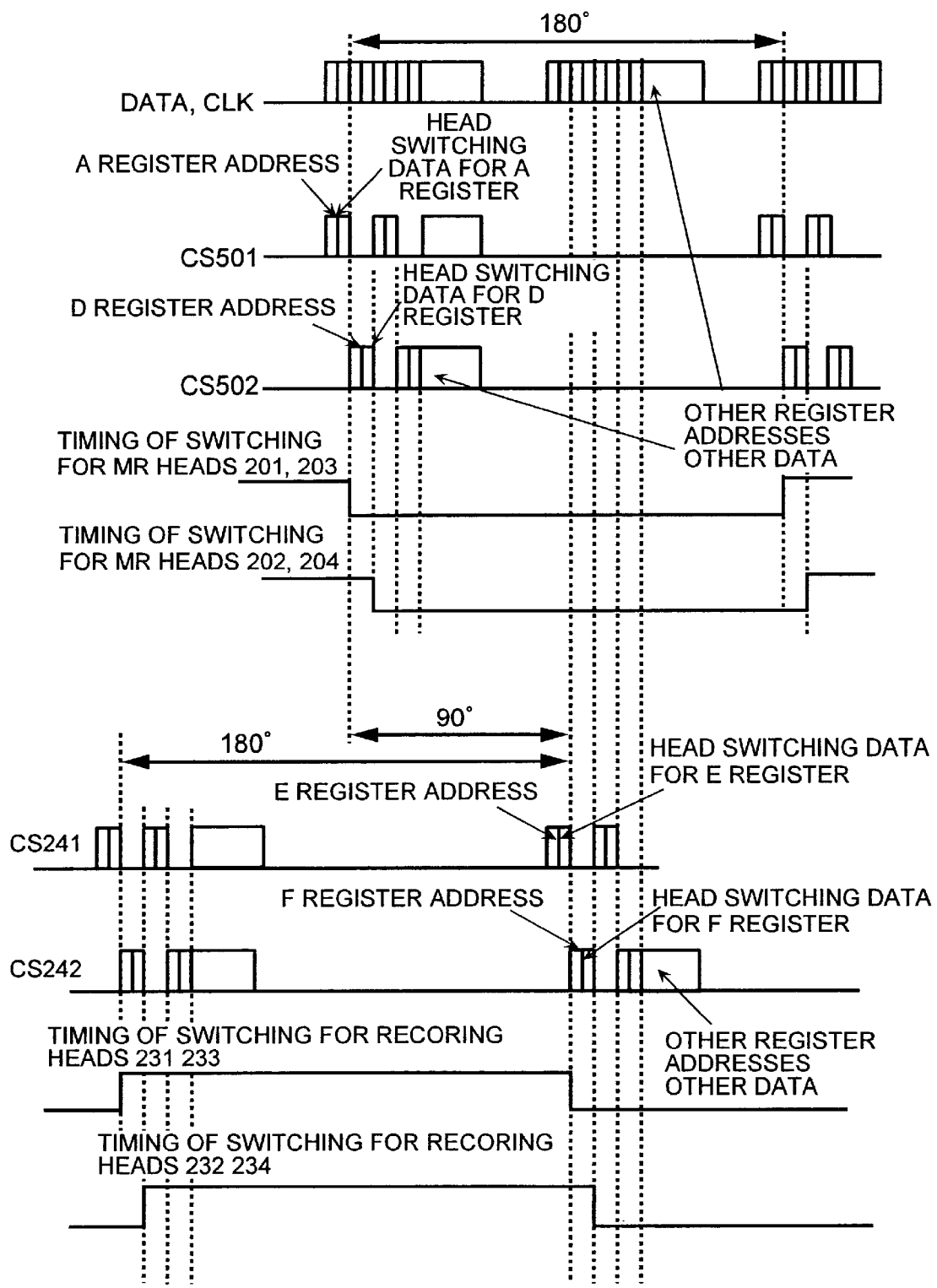
FIG. 11 illustrates in detail the control timing in the regenerative integrated circuit in the regenerative integrated circuit and the recording integrated circuit in the rotary magnetic head type apparatus shown in FIG. 6.

FIG. 11 illustrates in detail the control timing in the embodiment shown in FIG. 6.

As the recording system and the reproducing system are arranged 90° apart from each other, the control timing of the recording integrated circuits 241 and 242 and the control timing of the regenerative integrated circuits 501 and 502 are off each other by 90°. For both recording and reproducing, data are transmitted in the order of head switching signal data and amperage data.

First at the timing of MR head switching, a CS 501 signal for the regenerative integrated circuit 501 is outputted at the pertinent timing shown in FIG. 11 to transmit the address of register A, in which head switching data for the regenerative integrated circuit 501 are stored, and data. At the next time slot, a CS 502 signal for the regenerative integrated circuit 502 is outputted at the pertinent timing shown in FIG. 11 to transmit the address of register D, in which head switching data for the regenerative integrated circuit 502 are stored, and data. At the further next time slots are allocated again for the MR head current data of the regenerative integrated circuit 501 and for the MR head current data of the regenerative integrated circuit 502 to output CS 501 and CS 502 signals at the respective timings.

Similarly at recording head switching timings differing by 90° in phase, first a CS 241 signal for the recording integrated circuit 241 is outputted at the pertinent timing shown in FIG. 11 to transmit the address of register E, in which head switching data for the recording integrated circuit 241 are stored, and data. At the next time slot, a CS 242 signal for the recording integrated circuit 242 is outputted at the pertinent timing shown in FIG. 11 to transmit the address of register F, in which head switching data for the recording integrated circuit 242 are stored, and data. At the further next time slots are again allocated for the recording head current data of the recording integrated circuit 241 and for the recording head current data of the recording integrated circuit 242 to output CS 241 and CS 242 signals at the respective timings.

Data which need not be transmitted at every time of head switching including, for instance, the amplifier gain, high-pass filter cut-off frequency and switching data for a thermal asperity noise compensating circuit are allocated collectively to an area for transmission. As stated above, by outputting the signals in this area only at the time of starting up the apparatus or as required, the occurrence of data errors due to the infiltration of communication noise can be prevented.

In this embodiment, as head switching is given priority in every recording or regenerative integrated circuit, erroneous recording of signals and failure to reproduce signals can be prevented. Incidentally, in the foregoing description of this embodiment, the recording integrated circuits 241 and 242 and the regenerative integrated circuits 501 and 502 were supposed to be separated, they can as well be configured in combined recording/regenerative integrated circuits, and the recording and reproducing functions can be switched over between each other using the aforementioned three control lines. Further, though the mounting positions of the recording heads 231 and 233 are supposed to be at 90° with respect to the MR heads 201 and 203 in this embodiment, they may as well be at or around 0°. Their positions are not necessarily limited.

As hitherto described, the present invention makes possible early finalization of head switching and operating current setting. This helps prevent failure to reproduce signals and erroneous recording due to a delay in head switching, resulting in stable data recording and reproduction. Further according to the invention, it is possible to control the decoder and the regenerative integrated circuit via a single control line (having a rotary transformer or transformers and the like). Since it is difficult to increase the number of rotary transformers in a rotary magnetic head type apparatus, the invention can be applied with particular effectiveness. This does not mean, however, that the invention can be applied only to rotary magnetic head type apparatuses, but it can also be effectively applied to disk apparatuses.

Further, although the foregoing description supposed the use of digital signals as recorded/reproduced information signals, the applicability of the invention is not limited to digital signals, but the invention can also be applied to the transmission of frequency-modulated analog signals.

Also, where MR heads are used, not only head switching data but also data for controlling bias currents have to be transmitted at the time of head switching, the invention embodied as described is particularly useful. However, the application of the invention is not confined to apparatuses provided with MR heads, but can also cover other types of apparatuses in which plural heads are controlled by a recording/regenerative integrated circuit or circuits.

Where integrated circuits are used as in the embodiments described above, the increased numbers of functions and of integrated circuits result in a substantial increase in the quantity of necessary data, the invention can be applied with particular effectiveness. However, even where no integrated circuit is used, the application of the invention can help prevent erroneous operation due to a delay in data transmission at the time of switching over between plural heads.

The present invention is not limited to the above embodiments and various changes and modifications can be made within the spirit and scope of the present invention. Therefore, to appraise the public of the scope of the present invention, the following claims are made.

What is claimed is:

1. A reproducing apparatus, comprising:
   a plurality of heads;
   a reproducer which reproduces signals from a recording medium with the plurality of heads;
   a generator which generates control data for controlling the reproducer; and
   a transmitter which transmits control data generated by the generator to the reproducer; wherein:
   the control data comprises first data and second data,
   the first data includes switching data for controlling switching over among the plurality of heads
   the transmitter transmits the first data before the second data, and
   the transmitter provides a single channel sequentially carrying the first data and then the second data.

2. A reproducing apparatus, comprising:
   a plurality of heads;
   a reproducer which reproduces signals from a recording medium with the plurality of heads;
   a generator which generates control data for controlling the reproducer; and
   a transmitter which transmits control data generated by the generator to the reproducer, wherein:
   the control data comprises first data and second data,
   the first data includes switching data for controlling switching over among the plurality of heads,
   the transmitter gives priority to the first data over the second data in transmission, and
   the transmitter provides a single channel carrying both the first data and the second data.

3. A recording/reproducing apparatus provided with a plurality of heads, comprising:
   a recorder/reproducer which records/reproduces signals onto/from a recording medium with the plurality of heads;
   a generator which generates control data for controlling the recorder/reproducer; and
   a transmitter which transmits control data generated by the generating means generator to the recorder/reproducer, wherein:
   the control data comprises first data and second data,
   the first data includes switching data for controlling the switching over among the plurality of heads,
   the first data are is transmitted before the second data, and
   the transmitter provides a single channel from the generator to the recorder/reproducer which carriers both the first data and the second data.

4. A rotary magnetic head type apparatus, comprising:
   a rotary drum mounted with a plurality of magneto resistive heads;
   a stationary drum opposite to the rotary drum; and
   a rotary transformer which transmits signals between the rotary drum and the stationary drum, wherein:
   the rotary drum is connected to the plurality of magneto resistive heads and provided with a reproducing integrated circuit having a current supply circuit and a reproducing amplifier;
   the operation of the reproducing integrated circuit is controlled with digital data;
   a control signal generator which generates control signals for controlling the reproducing integrated circuit is connected to the stationary drum;
   the rotary drum is provided with a decoder circuit for discriminating data of the control signals;
   the control signals are transmitted from the stationary drum to the rotary drum by the rotary transformer in every period of rotation of the rotary drum;
   the operation of the reproducing integrated circuit is controlled with digital data outputted from the decoder circuit;
   the digital data includes head switching signal data for switching over among the plurality of magneto resistive heads, control signal data for controlling head currents of the magneto resistive heads and other control signal data for controlling the reproducing integrated circuit;
   the head switching signal data and the control signal data are first transmitted to the reproducing integrated circuit before the other control signal data, and
   the rotary transformer provides a single channel carrying the head switching signal data, the head currents control signal data and the other control signal data.

5. A recording/reproducing apparatus provided with a plurality of heads comprising:
   a recorder/reproducer which records/reproduces signals onto/from a recording medium with the plurality of heads;
   a generator which generates control data for controlling the recorder/reproducer; and
   a transmitter which transmits control data generated by the generator to the recorder/reproducer, wherein;
   the control data comprises first data and second data, the first data includes switching data for controlling switching over among the plurality of heads and recording current data for the plurality of heads, the second data includes amplifier gain data and other data for recorder/reproducer control, and the first data is transmitted before the second data.

6. A rotary magnetic head type apparatus, comprising:

a rotary drum mounted with a plurality of magneto resistive heads;

a stationary drum opposite to the rotary drum;

a rotary transformer which transmits signals between the rotary drum and the stationary drum, wherein:

the rotary drum is connected to the plurality of magneto resistive heads and provided with a reproducing integrated circuit having a current supply circuit and a reproducing amplifier;

the operation of the reproducing integrated circuit is controlled with digital data;

a control signal generator which generates control signals for controlling the reproducing integrated circuit is connected to the stationary drum;

the rotary drum is provided with a decoder circuit for discriminating data of the control signals;

the control signals are transmitted from the stationary drum to the rotary drum by the rotary transformer in every period of rotation of the rotary drum;

the operation of the reproducing integrated circuit is controlled with digital data outputted form the decoder circuit;

the control data comprises first data and second data;

the first data includes head switching signal data for switching over among the plurality of magneto resistive heads and control signal data for controlling head currents of the magneto resistive heads;

the second data includes amplifier gain data and thermal asperity noise compensating circuit data and other control signal data for controlling the reproducing integrated circuit; and the first data is transmitted before the second data.

7. A rotary magnetic head type apparatus according to claim 6, wherein the rotary transformer transmits the second data only once when the rotary magnetic head type apparatus is to be started up.

8. A rotary magnetic head type apparatus according to claim 6, wherein the head switching signal data for switching over among the plurality of magneto resistive heads is transmitted before the control signal data for controlling the head currents of the magneto resistive heads in the first data.

* * * * *